(12) United States Patent
Zhamu et al.

(10) Patent No.: US 8,753,740 B2
(45) Date of Patent: Jun. 17, 2014

(54) SUBMICRON-SCALE GRAPHITIC FIBRILS, METHODS FOR PRODUCING SAME AND COMPOSITIONS CONTAINING SAME

(75) Inventors: Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 840 days.

(21) Appl. No.: 12/592,970

(22) Filed: Dec. 7, 2009

(65) Prior Publication Data
US 2011/0135925 A1 Jun. 9, 2011

(51) Int. Cl.
*B32B 1/00* (2006.01)
(52) U.S. Cl.
USPC .......................... 428/367; 423/448; 252/502
(58) Field of Classification Search
USPC .............. 428/323, 367, 373, 447.1; 264/29.1, 264/108, 103; 156/296; 252/378
See application file for complete search history.

(56) References Cited

U.S. PATENT DOCUMENTS

| | | | |
|---|---|---|---|
| 4,565,683 A | | 1/1986 | Yates et al. |
| 4,663,230 A | | 5/1987 | Tennent |
| 4,915,925 A | * | 4/1990 | Chung ...................... 423/447.1 |
| 5,707,916 A | | 1/1998 | Snyder |
| 5,877,110 A | * | 3/1999 | Snyder et al. ................. 502/180 |
| 7,071,258 B1 | * | 7/2006 | Jang et al. ..................... 524/496 |
| 7,470,418 B2 | | 12/2008 | Yoon |
| 2007/0184348 A1 | * | 8/2007 | Sakurai et al. ............. 429/231.8 |
| 2009/0004095 A1 | | 1/2009 | Yoon |
| 2009/0008611 A1 | | 1/2009 | Oriji |
| 2009/0035569 A1 | | 2/2009 | Gonzalez Moral et al. |
| 2009/0039565 A1 | | 2/2009 | Reneker et al. |
| 2009/0075077 A1 | | 3/2009 | Yoon |
| 2009/0155578 A1 | | 6/2009 | Zhamu et al. |

FOREIGN PATENT DOCUMENTS

JP 2007182668 A * 7/2007

OTHER PUBLICATIONS

M. Toyoda, et al "Exfoliation of Carbon Fibers through Intercalation Compounds Synthesized Electrochemically," Carbon, 39 (2001) 1697-1707.
M. Toyoda, et al "Intercalation of Nitric Acid into Carbon Fibers," Carbon, 39 (2001) 2231-2237.
M. Toyoda, et al "Intercalation of Formic Acid into Carbon Fibers and their Exfoliation," Synthetic Metals, 130 (2002) 39-43.

(Continued)

*Primary Examiner* — Peter Y Choi
*Assistant Examiner* — Vincent A Tatesure

(57) ABSTRACT

The present invention provides a submicron-scaled graphitic fibril having a diameter or thickness less than 1 μm, wherein the fibril is free of continuous thermal carbon overcoat, free of continuous hollow core, and free of catalyst. The fibril is obtained by splitting a micron-scaled carbon fiber or graphite fiber along the fiber axis direction. The diameter or thickness is preferably less than 500 nm and can be greater or less than 100 nm. These graphitic fibrils exhibit exceptionally high electrical conductivity, thermal conductivity, elastic modulus, and strength. The present invention also provides several products that contain submicron graphitic fibrils: (a) paper, thin-film, mat, and web products; (b) rubber or tire products; (c) energy conversion or storage devices, such as fuel cells, lithium-ion batteries, and supercapacitors; (d) adhesives, inks, coatings, paints, lubricants, and grease products; (e) heavy metal ion scavenger; (f) absorbent (e.g., to recover spill oil); (g) sensors; (h) friction and brake components; (i) radiation-shield components; and (j) nanocomposite materials.

13 Claims, 15 Drawing Sheets

(56) References Cited

OTHER PUBLICATIONS

M. Toyoda, et al "Exfoliation of Nitric Acid Intercalated Carbon Fibers," Carbon, 41 (2003) 731-738.

M. Toyoda, et al "Exfoliation of Carbon Fibers," Journal of Physics and Chemistry of Solids, 65 (2004) 109-117.

M. Toyoda, et al "Prep. of Intercalation Compounds of Carbon Fibers through Electrolysis Using Phosphoric Acid Electrolyte," J of Phy.& Chem of Solids, 67 (2006) 1178-1181.

M. Toyoda, et al."Study of Novel Carbon Fiber Composite Used Exfoliated Carbon Fibers," Materials Science and Engineering, B 161 (2009) 202-204.

M. Toyoda, et al. "Acceleration of Graphitization in Carbon Fibers through Exfoliation," Carbon, 42 (2004) 2567-2572.

F. Zhang, et al. "Effect of Fiber Splitting on the Catalytic Graphitization of Electroless Ni-B-Coated PAN-Based Carbon Fibers," Surf. & Coating Tech., 203 (2008) 99-103.

\* cited by examiner

FIG. 2(C) 1 μm
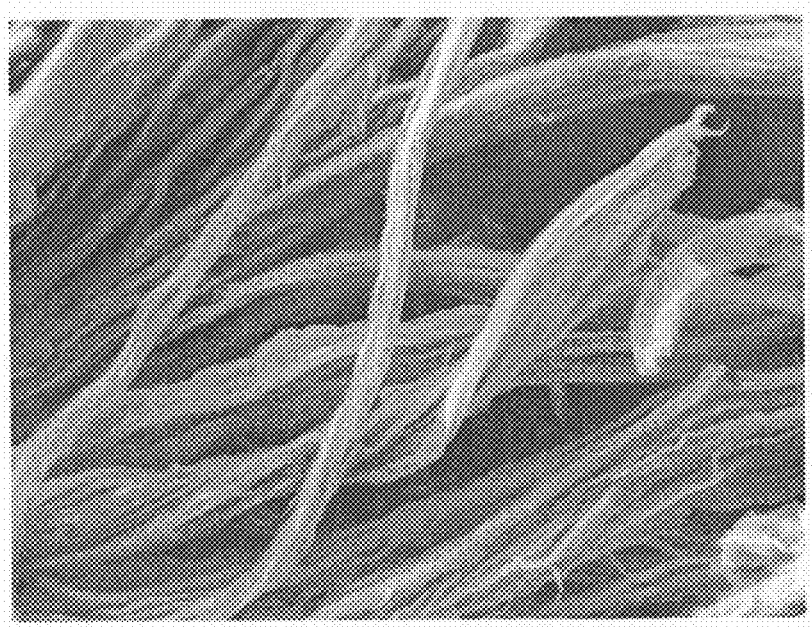
FIG. 2(D) 1μm

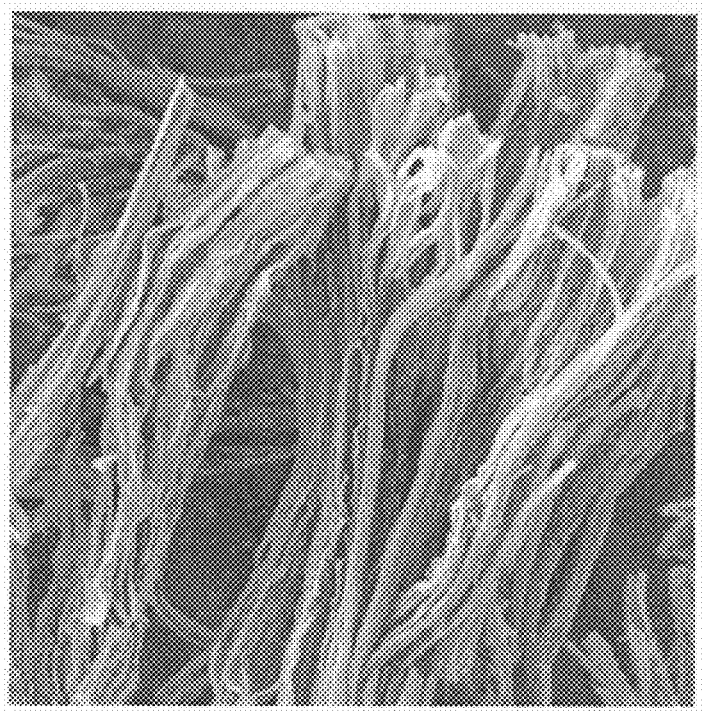
Fig. 7a — 1 μm
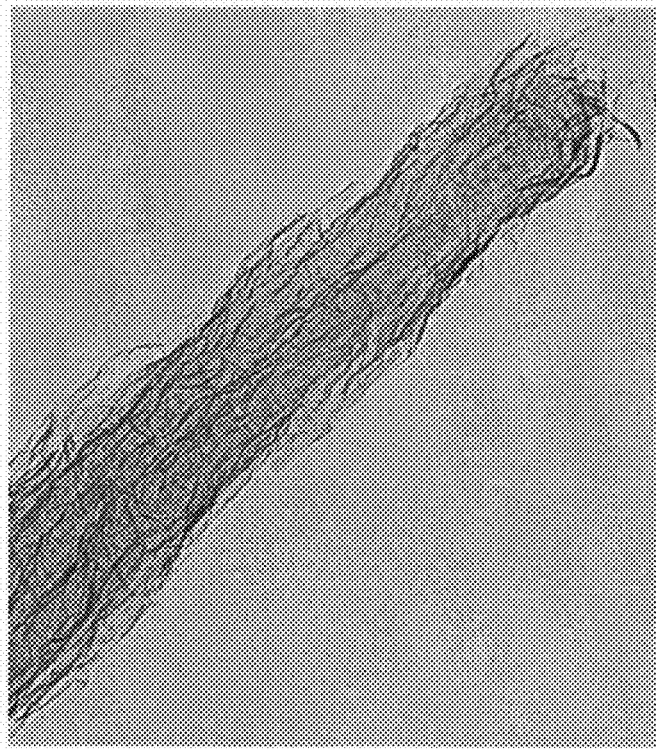
Fig. 7b   scale bar ——— 300 nm

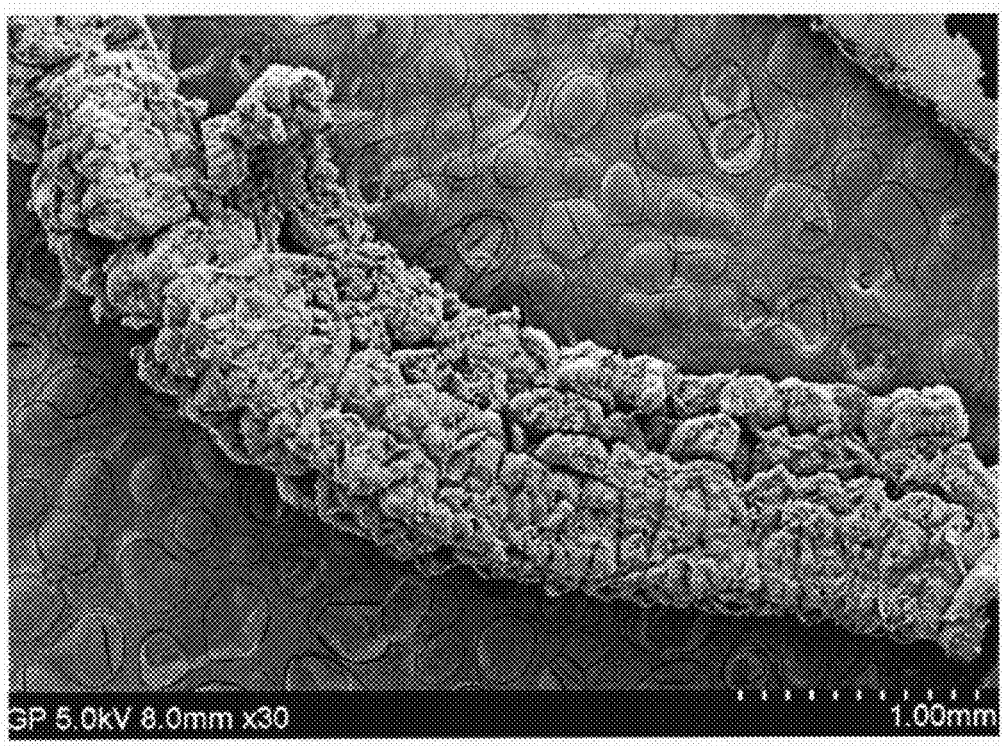
FIG. 7c
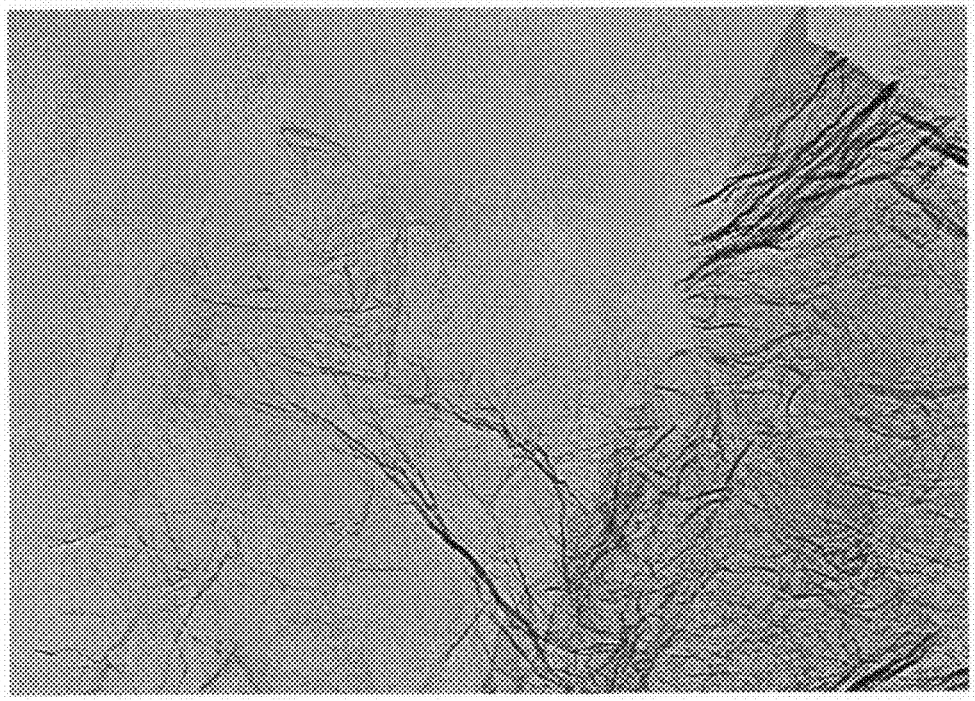
FIG. 7d         200 nm

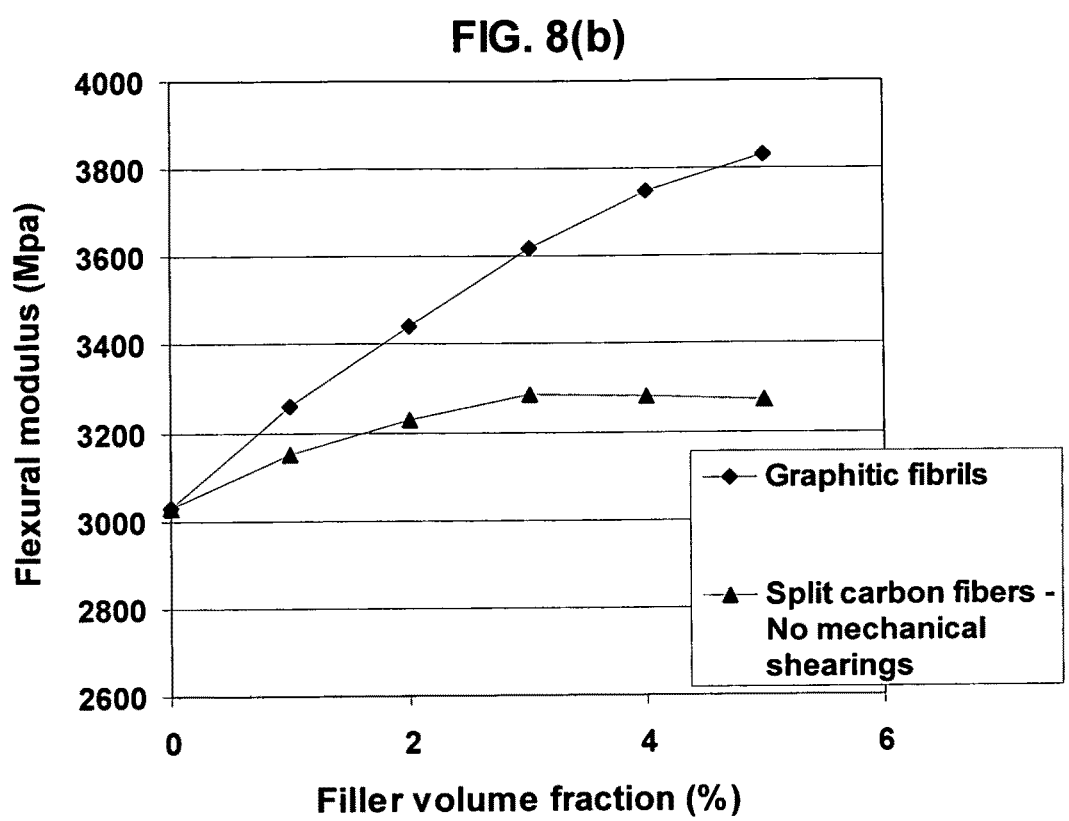

SUBMICRON-SCALE GRAPHITIC FIBRILS, METHODS FOR PRODUCING SAME AND COMPOSITIONS CONTAINING SAME

FIELD OF THE INVENTION

The present invention relates to a new type of carbon fibers or graphite fibers that are characterized by having a diameter or thickness lower than one micron (<1 µm) and, in some cases, lower than 100 nm, but mostly between 100 nm and 500 nm.

BACKGROUND

Carbon is known to have four unique crystalline structures, including diamond, graphite, fullerene, and carbon nano-tubes (and its larger-diameter cousins—carbon nano-fibers or CNFs). The carbon nano-tube (CNT) refers to a tubular structure grown with a single wall or multi-wall, which can be conceptually obtained by rolling up a graphene sheet or several graphene sheets to form a concentric hollow structure. A graphene sheet or basal plane is composed of carbon atoms occupying a two-dimensional hexagonal lattice. Carbon nano-tubes have a diameter on the order of a few nanometers to a hundred nanometers. Carbon nano-tubes can function as either a conductor or a semiconductor, depending on the rolled shape and the diameter of the tubes. Its longitudinal, hollow structure imparts unique mechanical, electrical and chemical properties to the material. Carbon nano-tubes are believed to have great potential for use in field emission devices, hydrogen fuel storage, rechargeable battery electrodes, and as composite reinforcements.

However, CNTs are extremely expensive due to the low yield and low production rates commonly associated with all of the current CNT preparation processes, such as arc discharge, laser ablation, chemical vapor deposition (CVD), and catalytic CVD (CCVD). The high material costs have significantly hindered the widespread application of CNTs. Earlier CNT production methods include those disclosed in the following patents: H. G. Tennent, "Carbon Fibrils, Method for Producing Same and Compositions Containing Same," U.S. Pat. No. 4,663,230 (May 5, 1987); C. Snyder, "Carbon Fibrils," U.S. Pat. No. 5,707,916 (Jan. 13, 1998).

Carbon nano-fibers (CNFs) are prepared from CVD, CCVD, or electro-spinning of polymer nano-fibers followed by carbonization. Electro-spinning has not been regarded as a mass-production method due to the limited amount of material that can be electro-spun with one hollow needle head. An example of the process to produce polymer nano-fibers via electro-spinning is given in D. H. Reneker, et al, "Processes for Producing Fibers and Their Use," US Pub. No. 2009/0039565 (Feb. 12, 2009).

The CNFs produced by the CVD and CCVD processes are commonly referred to as vapor-grown carbon nano-fibers (VG-CNFs). VG-CNFs have been extensively investigated in recent years and are commercially available at very high prices (e.g., $300/Kg). The following are some examples of CNF production processes: D. J. C. Yates, et al., "Production of Carbon Filaments," U.S. Pat. No. 4,565,683 (Jan. 21, 1986); S. H. Yoon, "Ultra-fine Fibrous Carbon and Preparation Method Thereof," US Pub. No. 2009/0075077 (Mar. 19, 2009); S. H. Yoon, "Ultra-fine Fibrous Carbon and Preparation Method Thereof," U.S. Pat. No. 7,470,418 (Dec. 30, 2008); S. H. Yoon, "Porous Filamentous Nano Carbon and Method of Forming the Same," US Pub. No. 2009/0004095 (Jan. 1, 2009); G. Oriji, "Carbon Nano Fiber, Production and Use," US Pub. No. 2009/0008611 (Jan. 8, 2009); J. L. Gonzales Moral, et al., "Carbon Nanofibers and Procedure for Obtaining Said Nanofibers," US Pub. No. 2009/0035569 (Feb. 5, 2009).

VG-CNFs and related CNTs have several drawbacks that have significantly constrained their scope of application:

(a) Both CVD and CCVD processes typically involve using a catalyst and the catalyst particles (e.g., transition metal nano particles or their alloys) usually become part of the resulting CNF or CNT structure. Normally, there is a significant amount of catalyst used in these processes. The residual catalyst, even just a trace amount, is considered undesirable in many applications. For instance, Fe is viewed as detrimental to the performance of a lithium ion battery if CNFs or CNTs are used as an anode active material. Catalytic particles can also catalyze or accelerate thermal or chemical degradation of a polymer matrix composite material.

(b) The CVD or CCVD processes intrinsically introduce a significant amount of impurities into the resulting CNFs or CNTs. It is not unusual to find a purity level (graphitic carbon content) in a CNF less than 80-90%.

(c) Depending upon the processing conditions, the graphene planes in different CNFs may be oriented at different angles with respect to the fiber axis. Furthermore, the graphene planes may be curved as a cup-shape or a cone-helix structure, which are not conducive to achieving high strength or modulus along the fiber axis. In one example, the fibers consist primarily of conical nano-fibers, but can contain a significant amount of bamboo nano-fibers. Most conical nano-fibers consist of an ordered inner layer and a disordered outer layer. When subjected to a thermal treatment above 1,500° C., some CNFs can undergo a structural transformation with the ordered inner layers changing from a cone-helix structure to a highly ordered multiwall stacked cone structure. The bamboo nano-fibers can have a tapered multiwall nanotube structure for the wall and a multi-shell fullerene structure for the cap of each segment, surrounded by a disordered outer layer. When these fibers are heat treated, the disordered outer layers transform to an ordered multiwall nanotube structure and merge with the wall of each segment. The end caps of each segment transform from a smooth multiwall fullerene structure to one consisting of disjointed graphene planes. Such a thermally induced instability in the CNF structure is an undesirable feature of CNFs for high-temperature applications (e.g., as a reinforcement in a carbon matrix composite).

(d) The CNFs typically have a continuous thermal carbon overcoat, which is a result of the thermal decomposition effect during the CNF formation process via the CVD, CCVD, or carbonization of electro-spun polymer nano-fibrils. Although this carbon overcoat could serve as a protective layer for the internal graphitic crystallites in some applications, the overcoat is detrimental to many other engineering applications. For instance, this overcoat makes it difficult to chemically functionalize the CNF surface, thereby inhibiting the formation of a strong bond between a CNF and a polymer matrix in a polymer composite. In a similar manner, a CNT has a complete, continuous graphene plane wrapped around the tube axis, which has few active sites where chemical functionalization can occur. Hence, chemical functionalization occurs only at the edge unless this surface is chemically treated (e.g., with a strong oxidizing agent, such as fuming sulfuric acid and nitric acid).

(e) In most of the VG-CNFs, the graphene planes or graphitic crystallites are oriented at a non-zero angle with respect to the fiber axis, resulting in a lower strength, modulus, thermal conductivity, and electrical conductivity along the fiber axis direction as compared with fibrils having all graphene planes substantially parallel to the fiber axis (e.g., CNTs).

Hence, it is desirable to have a carbon or graphite nano-fiber that has a well-controlled, consistent, and stable structure to ensure consistent properties and performance. It is further desirable to have a low-cost process that is capable of producing CNFs or graphitic nano-fibers in large quantities. It is also desirable to have CNFs or graphitic nano-fibers that are pure and catalyst-free. It is still further desirable to have CNFs or graphitic nano-fibers that exhibit much more surface areas for chemical functionalization or interactions with a chemical species or a matrix material. It is most desirable to have a CNF or graphitic fibril that exhibits a higher strength, modulus, thermal conductivity, and electrical conductivity as compared with conventional CNFs. The main object of the present invention is to provide submicron- or nanometer-scaled graphitic fibers that exhibit these desirable attributes.

SUMMARY OF THE INVENTION

The present invention provides a submicron-scaled graphitic fibril having a diameter or thickness less than 1 µm. The fibril is free of continuous thermal carbon overcoat, free of continuous hollow core, and free of catalyst. The fibril is obtained by splitting a micron-scaled carbon fiber or graphite fiber along the fiber axis direction to form an aggregate of still interconnected or partially bonded fibrils, followed by separating or isolating these fibrils from one another. This final separation or isolation step is critical to the preparation of graphitic fibrils. Un-separated or un-isolated structures are considered an "exfoliated fiber," which has vastly different properties from the presently invented isolated graphitic fibrils. The splitting procedure can be conveniently accomplished thermo-chemically in an environmentally friendly manner. The separation or isolation procedure can be conducted using a carefully controlled mechanical cutting or shearing procedure. The diameter or thickness of the resulting fibrils is typically between 100 nm and 1µ, but more typically less than 500 nm and can be greater or less than 100 nm.

These fully isolated graphitic fibrils exhibit exceptionally high electrical conductivity, thermal conductivity, elastic modulus, and strength. These are highly desirable features when they are used in the following applications:

(1) Graphitic fibrils can be used as a reinforcement filler in a structural composite or as a conductive additive in an electrically conductive composite for static charge dissipation, lightning strike protection, and shielding against electromagnetic interference (EMI) or radio frequency interference (RFI).
(2) The high thermal conductivity makes this class of graphitic fibers an outstanding material for thermal management applications.
(3) Multiple graphitic fibrils may be fabricated into a paper, thin-film, mat, or web form for various engineering applications (e.g., as a filter or membrane).
(4) Rubbers or tires containing these graphitic fibrils exhibit a good stiffening effect and improved heat-dissipating capability.
(5) These fibrils are also good electrode materials for energy conversion or storage devices, such as fuel cells (using graphitic fibrils as an ingredient in a gas diffuser plate, a conductive additive in a bipolar plate, or a substrate to support electro-catalyst particles), lithium-ion batteries (e.g., using graphitic fibrils as an anode active material), and supercapacitors (using graphitic fibrils as an electrode material).
(6) These conductive fibrils are also excellent additives for adhesives, inks, coatings, paints, lubricants, and grease products.
(7) The high proportion of chemically active edge surfaces of graphitic fibrils makes them good materials for environmental applications (e.g., as an agent to capture heavy metal ions such as cadmium in waste water stream and to capture oil in a spill situation), for sensor applications (e.g., as a sensing element for detecting biological agents), and as a filter or membrane material.

The submicron graphitic fibrils are preferably produced from a micron-diameter carbon fiber or graphite fiber, which is prepared from pitch, polyacrylonitrile (PAN), or rayon. Most of the conventional carbon or graphite fibers have a diameter of approximately 12 µm, but some have a diameter as small as 6 µm. The graphitic fibril production method preferably comprises: (a) introducing an intercalating agent into inter-crystallite spaces or imperfections of a micron-diameter carbon fiber or graphite fiber to form an intercalated fiber; (b) activating the intercalating agent to split the fiber into an aggregate of interconnected or partially bonded submicron graphitic fibrils having interconnections between fibrils; and (c) mechanically sever the interconnections to obtain the submicron graphitic fibrils or isolating fibrils from each other.

The step of introducing an intercalating agent may comprise chemical intercalating, electrochemical intercalating, gaseous phase intercalating, liquid phase intercalating, super-critical fluid intercalating, or a combination thereof. The chemical intercalating may comprise exposing a micron-diameter carbon fiber or graphite fiber to a chemical selected from sulfuric acid, sulfonic acid, nitric acid, a carboxylic acid, a metal chloride solution, a metal-halogen compound, halogen liquid or vapor, potassium permanganate, alkali nitrate, alkali perchlorate, an oxidizing agent, or a combination thereof. The carboxylic acid may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof.

For an intercalating agent, the metal-halogen compound or halogen liquid or vapor may comprise a molecule selected from bromine ($Br_2$), iodine ($I_2$), iodine chloride (ICl), iodine bromide (IBr), bromine chloride (BrCl), iodine pentafluoride ($IF_5$), bromine trifluoride ($BrF_3$), chlorine trifluoride ($ClF_3$), phosphorus trichloride ($PCl_3$), phosphorus tetrachloride ($P_2Cl_4$), phosphorus tribromide ($PBr_3$), phosphorus triiodide ($PI_3$), or a combination thereof.

The electrochemical intercalating may comprise using nitric acid, formic acid, or a carboxylic acid as both an electrolyte and an intercalate source. Preferably, the electrochemical intercalating comprises imposing a current, at a current density in the range of 50 to 500 $A/m^2$, to the carbon fiber or graphite fiber which is used as an electrode material.

The step of splitting the intercalated fiber may comprise exposing the intercalated fiber to a temperature in the range of 150° C. to 1,100° C. When the step of intercalating comprises using an acid as an intercalating agent, the step of splitting the intercalated fiber typically comprises exposing the intercalated fiber to a temperature in the range of 600° C. to 1,100° C. When the step of intercalating comprises using a halogen or halogen compound as an intercalating agent, the step of splitting the intercalated fiber typically comprises exposing the intercalated fiber to a temperature in the range of 50° C. to 350° C.

It may be noted that an exfoliated graphite fiber was disclosed by D. D. L. Chung, in "Exfoliated Graphite Fibers and Associated Method," U.S. Pat. No. 4,915,925 (Apr. 10, 1990). However, according to Chung, "Graphite fibers are exfoliated to produce a fiber of reduced density, increased diameter, and flexibility with respect to graphite fibers prior to exfoliation" (see Abstract of U.S. Pat. No. 4,915,925). Chung did not expressly disclose or implicitly suggest the production of graphitic nano-fibers from the exfoliated graphite fibers via mechanical shearing or cutting. Chung did not recognize or realize the significance of isolated graphitic fibrils. As a matter of fact, the objective of Chung's process of exfoliation was to reduce the density and increase the diameter of the graphite fibers, which were completely opposite to the objectives of the present invention. Our main objective was to extract submicron fibrils from the internal structure of a carbon or graphite fiber and these submicron graphitic fibrils have higher density and much lower diameters than the original carbon or graphite fiber.

Exfoliation of carbon fibers was also studied by M. Toyoda, et al.: "Exfoliation of Carbon Fibers through Intercalation Compounds Synthesized Electrochemically," Carbon, 39 (2001) 1697-1707; "Intercalation of Nitric Acid into Carbon Fibers," Carbon, 39 (2001) 2231-2237; "Intercalation of Formic Acid into Carbon Fibers and their Exfoliation," Synthetic Metals, 130 (2002) 39-43; "Exfoliation of Nitric Acid Intercalated Carbon Fibers," Carbon, 41 (2003) 731-738; "Exfoliation of Carbon Fibers," Journal of Physics and Chemistry of Solids, 65 (2004) 109-117; "Preparation of Intercalation Compounds of Carbon Fibers through Electrolysis Using Phosphoric Acid Electrolyte and their Exfoliation," Journal of Physics and Chemistry of Solids, 67 (2006) 1178-1181; "Study of Novel Carbon Fiber Composite Used Exfoliated Carbon Fibers," Materials Science and Engineering, B 161 (2009) 202-204. Again, just like Chung, Toyoda et al did not expressly disclose or implicitly suggest the production of graphitic nano-fibers from exfoliated graphite fibers via mechanical shearing or cutting of the interconnections between the constituent fibrils of an exfoliated carbon fiber. Toyoda et al did not recognize or realize the significance of isolated graphitic fibrils. Again, the isolation or separation of the interconnected constituent fibrils in an exfoliated or split carbon fiber is a critical step in the production of the presently invented graphitic fibrils. This critical step was not taught in either Chung or Toyoda, et al.

Further, Toyoda et al exfoliated carbon fibers as a means of accelerating the graphitization of carbon fibers, as disclosed in "Acceleration of Graphitization in Carbon Fibers through Exfoliation," Carbon, 42 (2004) 2567-2572. Similarly, Zhang et al split carbon fibers to facilitate the graphitization procedure, as disclosed in F. Zhang, et al. "Effect of Fiber Splitting on the Catalytic Graphitization of Electroless Ni—B-Coated Polyacrylonitrile-Based Carbon Fibers," Surface & Coating Technology, 203 (2008) 99-103. Neither case was directed at creating isolated/separated graphitic fibrils.

It may be further noted that the instant applicants have previously disclosed a nano-scaled graphene platelet (NGP) having a thickness no greater than 100 nm and a length-to-width ratio no less than 3 (preferably greater than 10) from a carbon or graphite fiber using a seemingly similar but actually distinct process [Zhamu et al., "Nano-scaled graphene platelets with a high length-to-width aspect ratio," US Pub. No. 2009/0155578 (Jun. 18, 2009)]. The NGP with a high length-to-width ratio was prepared by using a method comprising (a) intercalating a carbon fiber or graphite fiber with an intercalate to form an intercalated fiber; (b) exfoliating the intercalated fiber to obtain an exfoliated fiber comprising graphene sheets or flakes; and (c) separating the graphene sheets or flakes to obtain nano-scaled graphene platelets (NGPs). Step (a) in our earlier disclosure was typically carried out to the extent that the intercalating agent significantly penetrates the bulk of the graphite crystallites so that the subsequent exfoliation step produced ultra-thin nano graphene sheets or NGPs that are typically thinner than 100 nm, but more typically thinner than 1 nm (as indicated in claim 6 of US 2009/0155578).

In contrast, the process of the instant application involves intercalating a carbon fiber or graphite fiber to the extent that the intercalating agent penetrates into primarily the inter-crystallite zones or imperfections in a carbon or graphite fiber so that the subsequent high-temperature exposure or pressure change step acts to split the fiber into multiple interconnected submicron graphitic fibrils having interconnections between the fibrils. The interconnected fibrils typically have a diameter or thickness in the range of 100 nm to 1 μm, more typically in the range of 100 nm to 500 nm. The subsequent mechanical cutting step serves to sever the interconnections to recover the submicron graphitic fibrils. Operationally, it might be possible or even desirable for an intercalating agent to penetrate into some interstitial spaces between graphene planes, but this was not a necessary condition for the production of the presently invented graphitic fibrils.

The present invention also provides a nanocomposite material that contains submicron graphitic fibrils. The matrix material can be selected from a polymer, rubber, plastic, resin, glass, ceramic, carbon, metal, organic, or a combination thereof. These nanocomposite materials exhibit many unique and desirable properties.

Other embodiments of the present invention include products that contain submicron graphitic fibrils: (a) paper, thin-film, mat, and web products (e.g., as a filter or membrane material); (b) rubber or tire products; (c) energy conversion or storage devices, such as fuel cells (as an ingredient in a bipolar plate or a gas diffuser plate, or as a substrate to support electro-catalyst particles for PEM fuel cells), lithium batteries and supercapacitors (e.g., as an electrode active material, a conductive additive, or a current collector ingredient in a supercapacitor, lithium ion battery, lithium metal battery, and/or lithium-air battery); (d) adhesives, inks, coatings, paints, lubricants, and grease products; (e) heavy metal ion scavenger; (f) absorbent (e.g., to recover spill oil); (g) sensors; (h) friction and brake components; and (i) high-energy radiation shielding components.

and (e) three sets of split but un-separated graphitic fibrils from three carbon fiber segments.

Figure 3:
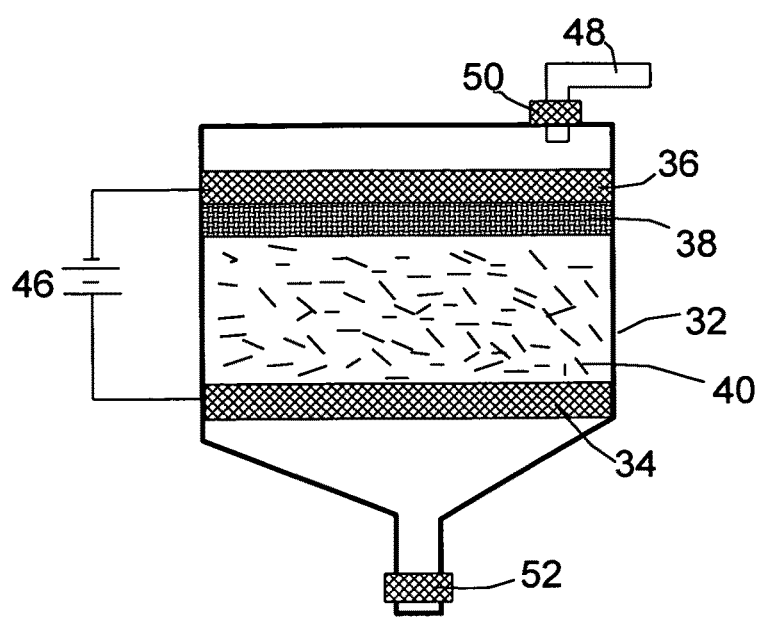

FIG. 3 Schematic of an apparatus for electrochemical intercalation of carbon or graphite fibers.

FIG. 4 (A) flexural strength and (B) flexural modulus of composite materials containing graphitic fibrils from graphite fibers, multi-walled carbon nanotubes (MW-CNTs), and vapor-grown carbon nanofibers (VG-CNFs).

Figure 5:
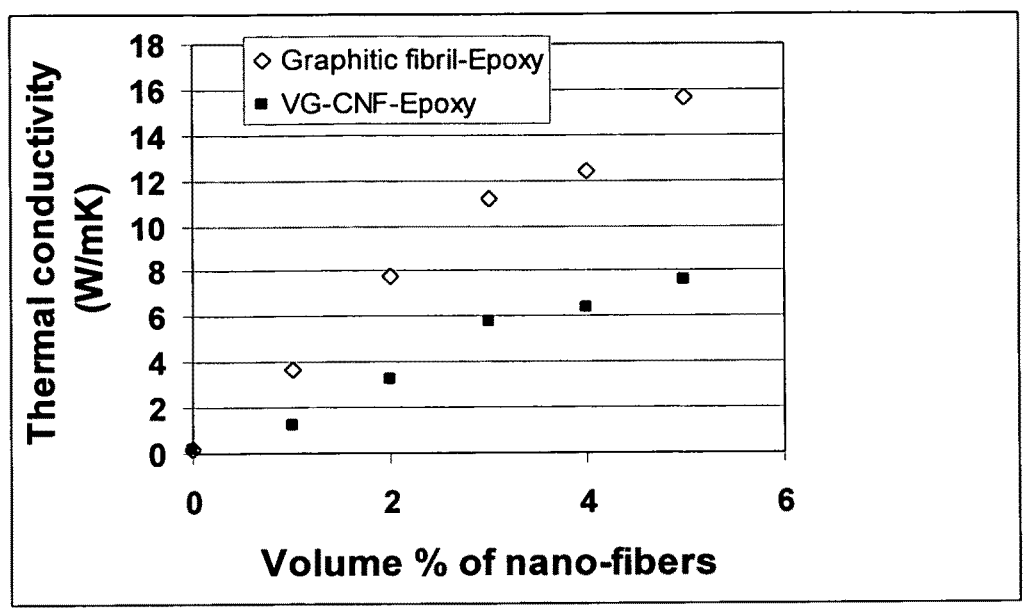

FIG. 5 Thermal conductivity of nanocomposites containing graphitic fibrils and VG-CNFs.

Figure 6:
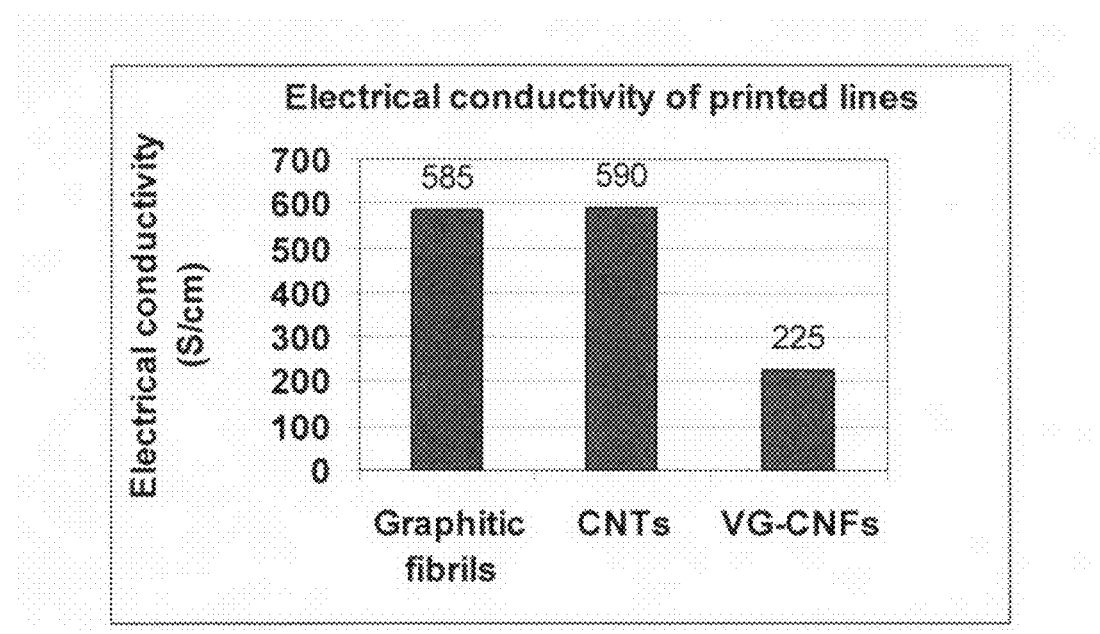

FIG. 6 Electrical conductivity of printed traces containing graphitic fibrils, MW-CNTs, and VG-CNFs.

FIG. 7 SEM images of (a) examples of split graphite fibers (without mechanical shearing); (b) an isolated graphitic fibril; (c) exfoliated graphite (without mechanical shearing to break up the graphene sheets); and (d) graphene sheets (NGPs) obtained by isolating graphene sheets via mechanical shearing of exfoliated graphite.

Figure 8A:
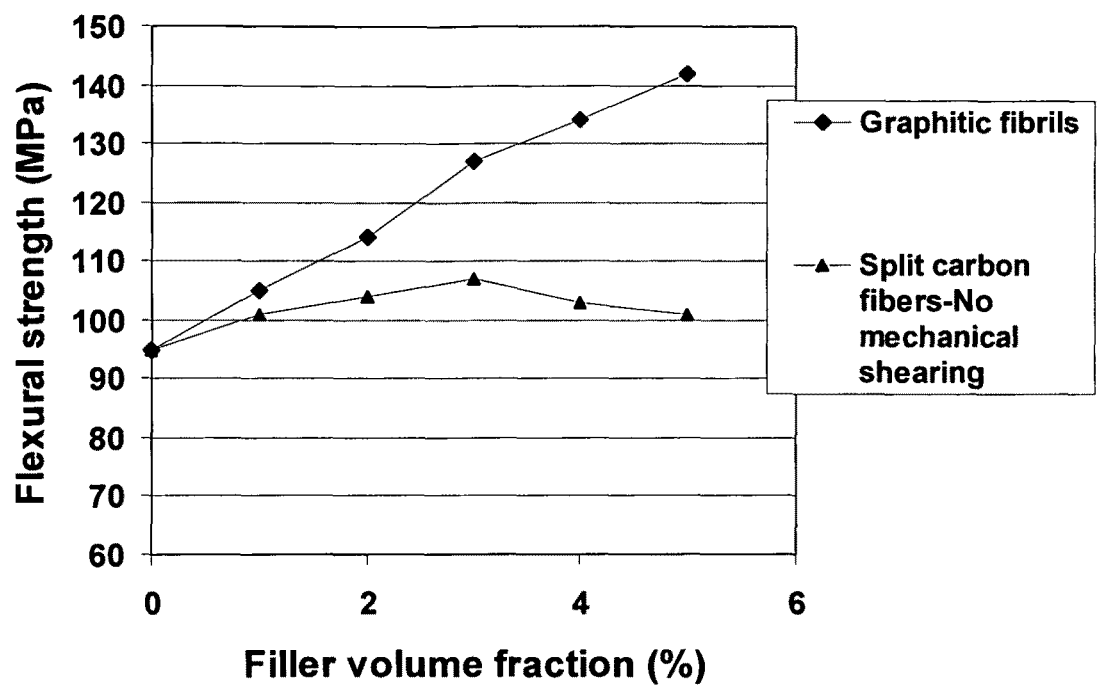

FIG. 8 (a) flexural strength and (B) flexural modulus of composite materials containing split fibers (composed of interconnected fibrils) and the composites containing isolated graphitic fibrils.

FIG. 9 (a) flexural strength and (B) flexural modulus of prior art PMMA composite materials containing exfoliated fibers (composed of interconnected fibrils; no fibril separation/isolation treatment) and the PMMA composites containing isolated graphitic fibrils of the present invention.

DETAILED DESCRIPTION OF PREFERRED EMBODIMENTS

Figure 1:
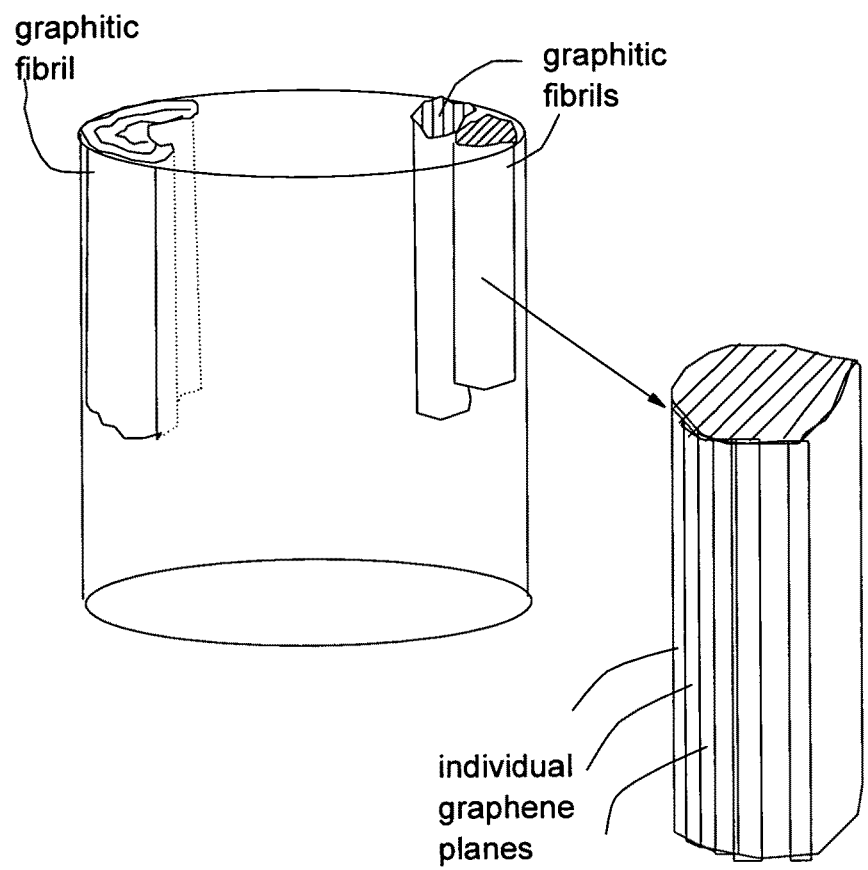
FIG. 1 Schematic of a carbon or graphite fiber consisting of multiple graphitic fibrils, which are bounded by inter-fibril spaces or imperfections (equivalent to grain boundaries). Each graphitic fibril comprises a graphite single crystal or crystallite having multiple graphene planes stacked or bonded together via van der Waals forces along the crystallographic c-axis direction.

Carbon materials can assume an essentially amorphous structure (glassy carbon), a highly organized crystal (graphite crystallite), or a whole range of intermediate structures that are characterized in that various proportions and sizes of graphite crystallites and defects are dispersed in a non-crystalline matrix. Typically, a graphite crystallite is composed of a number of basal planes (also referred to as graphene planes or graphene sheets) that are bonded together through van der Waals forces in the crystallographic c-axis direction, the direction perpendicular to the basal plane. These graphite crystallites typically have one dimension on the submicron or nanometer scale. The graphite crystallites are dispersed in or connected by crystal defects (imperfections) or an amorphous phase in a natural graphite particle. The graphite crystallites in a carbon or graphite fiber, schematically shown in FIG. 1, are typically elongated fibrils having a length greater than 10 μm and a lateral dimension (thickness or diameter) less than 1 μm (hence, the name "submicron" fibrils). This lateral dimension is typically between 100 nm and 1 μm, but more typically between 100 nm and 500 nm (some fibrils with a diameter <100 nm were also observed).

The present invention provides a method of extracting or isolating these submicron graphitic fibrils from a micron-diameter carbon or graphite fiber (typically 6-12 μm in diameter). These graphitic fibrils, when successfully isolated, provide essentially perfect graphite single crystals with the graphene planes (hexagon carbon structures with sp$^2$ electron hybridization) already pre-oriented parallel to the fibril axis direction. We have most surprisingly observed that these submicron graphitic fibrils have properties comparable to those of multi-walled CNTs and superior to those of VG-CNFs (further discussed in a later section).

A carbon or graphite fiber is obtained from a precursor, such as polyacrylonitrile (PAN), petroleum or coal tar pitch, or rayon. The production of PAN-based carbon fibers involves oxidation of PAN fibers and carbonization of the resulting oxidized fibers at a temperature typically from 350° C. to 2,500° C. Pitch-based carbon fibers are obtained by heat-treating a pitch precursor to form a meso-phase or liquid crystalline phase. The procedure is followed by fiber spinning and carbonization. Both PAN- and pitch-based carbon fibers can be further heat-treated or graphitized at a temperature of 2,500° C. to 3,000° C. to obtain graphite fibers. Graphite fibers are characterized by having more perfect and larger graphite crystallites, which are better oriented along the fiber axis direction, compared to carbon fibers. In the field of composite materials, many workers do not distinguish the term carbon fiber from graphite fiber. It may be noted that the graphite crystallites or graphitic fibrils in a graphite fiber are no different in nature from those in a carbon fiber, with the exception that the fibrils in a highly graphitized fiber are normally larger in dimensions.

One preferred embodiment of the present invention is a submicron-scaled graphitic fibril having a diameter or thickness less than 1 μm, wherein the fibril is free of continuous thermal carbon overcoat, free of continuous hollow core, and free of catalyst. The fibril is obtained by splitting a micron-scaled carbon fiber or graphite fiber along the fiber axis direction. No catalyst is used, and no expensive and slow process, such as chemical vapor deposition (CVD), catalytic chemical vapor deposition (CCVD), laser ablation, or plasma arc discharge, is needed. The diameter or thickness is preferably less than 500 nm and can be greater or less than 100 nm. With a thickness greater than 100 nm, the fibrils would have >300 layers of graphene plane stacked together.

Most of the graphitic fibrils have a length greater than 5 μm, more commonly greater than 10 μm, even more commonly greater than 50 μm, but can be several hundreds of μm. Elemental and X-ray diffraction analyses of these graphitic fibrils indicate that they contain at least 95% by weight carbon atoms arranged in a hexagon or graphene structure. Most commonly, these fibrils comprise at least 98% by weight carbon atoms arranged in a hexagon or graphene structure.

It is of significance to point out that the original micron-diameter carbon fiber or graphite fiber contains therein very many inter-crystallite zones or imperfections, which are the weak links in the structure. In contrast, by separating or isolating the graphitic fibrils from one another to become individual entities, these fibrils are essentially defect-free, single crystal type structures. These single crystals should then have ultra-high strength and elastic modulus. Further, these fibrils are composed of essentially perfect stacks of graphene planes aligned in the fibril axis direction and graphene is known to have exceptional electrical and thermal conductivity. Hence, the isolated graphitic fibrils should exhibit excellent thermal and electrical conduction behaviors. We have conducted diligent research work and experimentally proven that this indeed is the case.

Another preferred embodiment of the present invention is a method of producing submicron graphitic fibrils. The method comprises: (a) introducing an intercalating agent into inter-crystallite spaces or imperfections of a micron-diameter carbon fiber or graphite fiber to form an intercalated fiber; (b) activating the intercalating agent to split the intercalated fiber into multiple interconnected submicron graphitic fibrils having interconnections between fibrils; and (c) mechanically severing the interconnections to obtain the submicron graphitic fibrils.

Figure 2A:
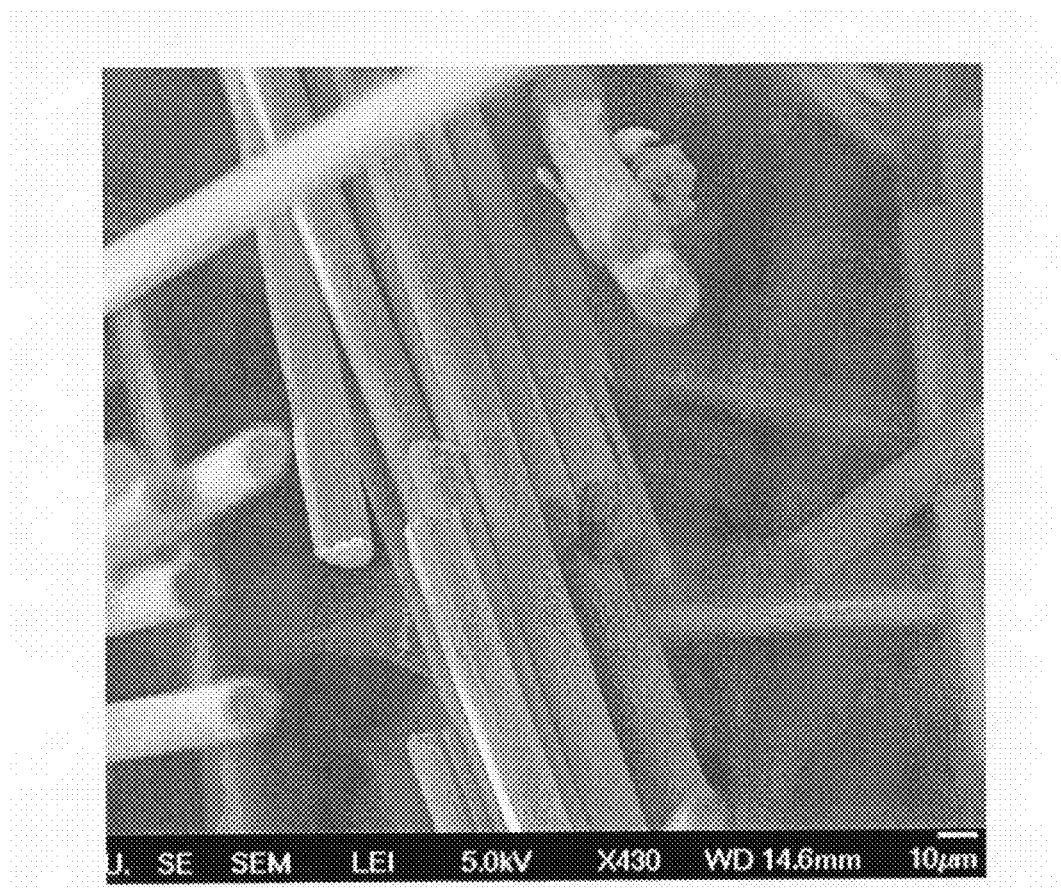
FIG. 2 SEM images of (a) examples of milled carbon fibers (as a starting micron-diameter fiber); (b) chemically intercalated carbon fibers (some inter-fibril zones or imperfections are discernible); (c) a split carbon fiber (from upper left corner to the lower right corner of the SEM image) having interconnected or partially bonded graphitic fibrils; (d) un-separated, multiple graphitic fibrils split from another carbon filament.
Figure 2B:
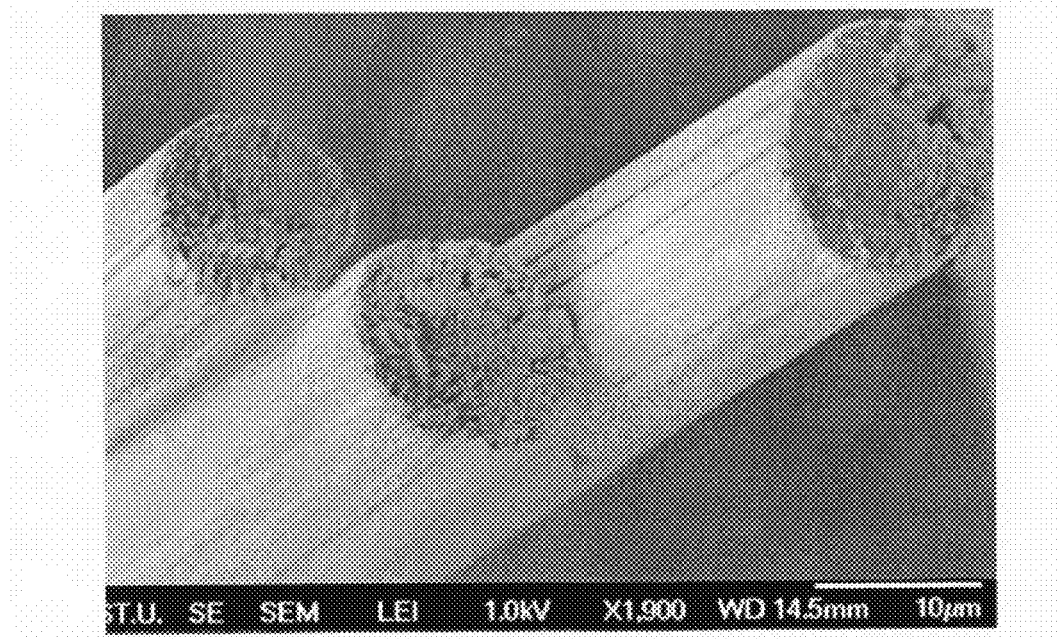

FIG. 2 provides SEM images of some examples to illustrate this process for producing graphitic fibrils. FIG. 2 (a) shows some milled carbon fibers with a diameter of approximately 12 μm. FIG. 2(b) shows the chemically intercalated version of these carbon fibers (some inter-fibril zones or imperfections are discernible). The diameter remains unchanged since the intercalating agent penetrates into the imperfection or inter-graphitic fibril zones only. This was further confirmed by X-ray diffraction data, which indicate that the diffraction peak at $2\theta=26°$, corresponding to an interplanar spacing of d=0.335 nm, remains unchanged after intercalation. If the intercalating agent had significantly penetrated the inter-graphene spacing, the $2\theta$ would have decreased to approximately 13°, corresponding to an interplanar spacing of d=0.55-0.65 nm commonly found in a graphite intercalation compound.

Figure 2E:
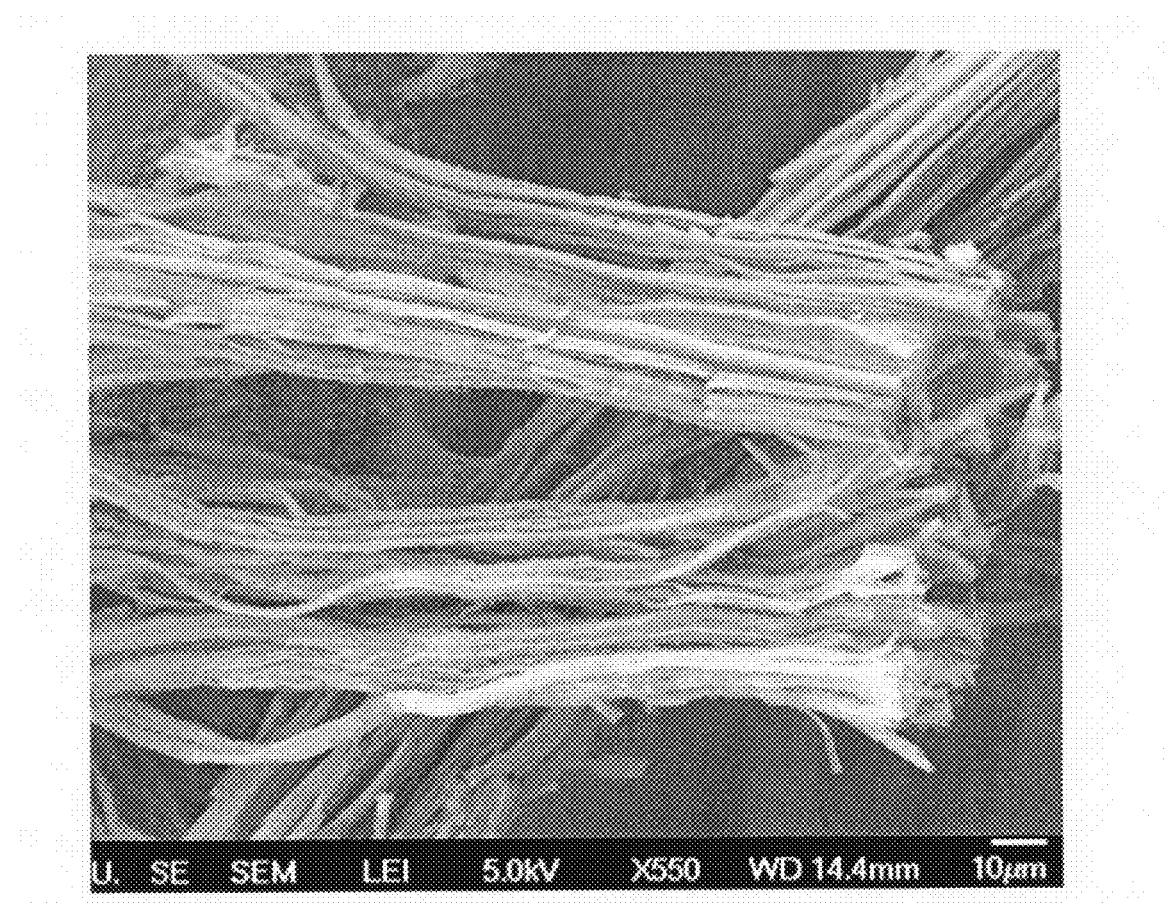

FIG. 2 (c) shows a split carbon fiber (which is positioned from the upper left corner to the lower right corner of the SEM image) having interconnected graphitic fibrils. FIG. 2(d) shows multiple graphitic fibrils split from another carbon filament and FIG. 2(e) shows three sets of split but un-separated graphitic fibrils from three carbon fiber segments.

The step of introducing an intercalating agent may comprise chemical intercalating, electrochemical intercalating, gaseous phase intercalating, liquid phase intercalating, supercritical fluid intercalating, or a combination thereof. The chemical intercalating may comprise exposing the carbon fiber or graphite fiber to an intercalate (intercalating agent or intercalant) selected from sulfuric acid, sulfonic acid, nitric acid, a carboxylic acid, a metal chloride solution, a metal-halogen compound, halogen liquid or vapor, potassium permanganate, alkali nitrate, alkali perchlorate, an oxidizing agent, or a combination thereof. The carboxylic acid may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Alternatively, the intercalant may comprise an alkali metal (e.g., Li, Na, K, Rb, Cs, or a combination thereof, such as a eutectic).

For an intercalating agent, the metal-halogen compound or halogen liquid or vapor may comprise a molecule selected from bromine ($Br_2$), iodine ($I_2$), iodine chloride (ICl), iodine bromide (IBr), bromine chloride (BrCl), iodine pentafluoride ($IF_5$), bromine trifluoride ($BrF_3$), chlorine trifluoride ($ClF_3$), phosphorus trichloride ($PCl_3$), phosphorus tetrachloride ($P_2Cl_4$), phosphorus tribromide ($PBr_3$), phosphorus triiodide ($PI_3$), or a combination thereof.

In the case of a chemical intercalation (using an acid as an intercalant, for instance), the method comprises:

(a) forming an acid-intercalated fiber by a chemical intercalation reaction which, as examples, uses a combination of a sulfuric acid and nitric acid, or a combination of carboxylic acid and hydrogen peroxide, as an intercalate source. In these two examples, sulfuric acid or carboxylic acid serves as an intercalating agent while nitric acid or hydrogen peroxide serves as an oxidizing agent in an intercalant-oxidizer mixture. The carbon or graphite fiber is simply immersed in such a mixture at a desired temperature (typically 20-80° C.) for a length of time sufficient for effecting the intercalation reaction. It may be noted that if the intercalation time is sufficiently short (e.g. <30 minutes in a mixture of sulfuric acid and nitric acid), intercalation appears to be limited to the inter-crystallite spaces or imperfections only with little acid penetrating into inter-graphene plane spaces. Longer intercalation times usually led to penetration of intercalants into both inter-crystallite and inter-graphene spaces. As a result, one tended to obtain ultra-thin nano graphene platelets with a thickness <100 nm, as observed and reported by the applicants earlier [Zhamu et al., US Pub. No. 2009/0155578, Jun. 18, 2009]);

(b) rapidly heating the intercalated carbon or graphite fiber to a high temperature and allowing the fiber to stay at this temperature for a desired length of time sufficient for expanding the intercalating agent (sulfuric acid being decomposed to produce highly volatile gases that act to push apart graphitic fibrils), thereby producing a split fiber (e.g., 650° C.-1,100° C. in the cases where a mixture of an acid and an oxidizing agent is used as an intercalate). The carboxylic acid intercalation is preferred as the subsequent splitting step in this case does not involve the evolution of undesirable species, such as $NO_x$ and $SO_x$, which are common by-products of exfoliating conventional sulfuric or nitric acid-intercalated graphite compounds; and (c) subjecting the resulting split fiber to a mild mechanical shearing treatment (e.g., using a rotating-blade mill, air mill, pressurized gas mill, ball mill, or untrasonicator) to sever the interconnections between fibrils to produce the desired graphitic fibrils.

The carboxylic acid, containing only C, H, and O atoms, may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_nCOOH$, wherein n is a number of from 0 to 5, including formic, acetic, propionic, butyric, pentanoic, and hexanoic acids, anydrides thereof, reactive carboxylic acid derivatives thereof, and combinations thereof. In place of the carboxylic acids, the anhydrides or reactive carboxylic acid derivatives such as alkyl esters can also be employed. Representative of alkyl esters are methyl formate and ethyl formate. The most preferred carboxylic acids are formic acid and acetic acid.

Representative of dicarboxylic acids are aliphatic dicarboxylic acids having 2-12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Among the polycarboxylic acids, citric acid is preferred due to its availability and low cost.

Carboxylic acids can be intercalated into carbon fibers both chemically and electrochemically. The carboxylic acid-intercalated carbon or graphite fiber can be easily split by rapidly heating the intercalated fiber at a desired temperature. An advantage of such a carboxylic acid-intercalated fiber in comparison with sulfuric acid-intercalated material is that only H, C and O are released into the atmosphere during the exfoliation process. Depending on the applied current density (in the case of electrochemical intercalation) and the reaction time, an expansion volume of from 30-100 ml/g, at 400-800° C., and volatile content of 5-15 wt %, could be obtained. Furthermore, the split fiber and subsequent graphitic fibrils do not contain additional corrosive species, such as chlorine, fluorine, nitrogen, and phosphor.

The mechanical shearing treatment, used to separate graphitic fibrils preferably comprises using air milling (including air jet milling), ball milling, mechanical shearing (including rotating blade fluid grinding), any fluid energy based high-shearing process, ultrasonication, or a combination thereof.

In the case of electrochemical intercalation, the desired graphitic fibrils may be obtained by a method comprising: (a) forming an acid-intercalated carbon or graphite fiber by an electrochemical reaction which uses an acid (e.g., formic acid, nitric acid, or a carboxylic acid) as both an electrolyte and an intercalate source, the carbon or graphite fiber as an anode material, and a metal or graphite as a cathode material, and wherein a current is imposed upon the cathode and the anode at a current density for a duration of time sufficient for effecting the electrochemical reaction; (b) exposing the intercalated carbon or graphite fiber to a thermal shock to produce a split fiber; and (c) subjecting the split fiber to a mechanical shearing treatment to produce the graphitic fibrils. The fiber splitting step preferably comprises heating the intercalated carbon or graphite fiber to a temperature in the range of 300-1,100° C. for a duration of 10 seconds to 1 minute, most preferably at a temperature in the range of 400-600° C. for a duration of 30-60 seconds.

Schematically shown in FIG. 3 is an apparatus that can be used for electrochemical intercalation of carbon or graphite fibers according to a preferred embodiment of the present invention. The apparatus comprises a container 32 to accommodate electrodes and electrolyte. The anode is comprised of multiple carbon or graphite fiber segments 40 that are dispersed in an electrolyte (e.g., a carboxylic acid, which is also an intercalating agent) and are supported by a porous anode supporting element 34, preferably a porous metal plate, such as platinum or lead. The carbon or graphite fiber segments 40 preferably form a continuous electron path with respect to the anode support plate 34, but are accessible to the intercalating agent. An electrically insulating, porous separator plate 38 (e.g., Teflon fabric or glass fiber mat) is placed between the anode and the cathode 36 (e.g., a porous graphite or metal plate) to prevent internal short-circuiting. A DC current source 46 is used to provide a current to the anode support element 34 and the cathode 36. The imposing current used in the electrochemical reaction preferably provides a current density in the range of 50 to 600 A/m$^2$, most preferably in the range of 100 to 400 A/m$^2$. Fresh electrolyte (intercalate) may be supplied from an electrolyte source (not shown) through a pipe 48 and a control valve 50. Excess electrolyte may be drained through a valve 52. In a possible arrangement, the carbon or graphite fiber segments 40 may be long or continuous-length fiber yarns that are used as an anode directly connected to a DC current source.

Carbon or graphite fibers also can be intercalated with an alkali metal. For instance, the fiber sample may be heated to 200° C. in an evacuated tube in the presence of potassium to form an intercalated fiber. The intercalated fiber is then brought in contact with a liquid, such as methanol, ethanol, a hydroxylic solvent, or a solvent containing water. Rapid splitting of the fiber can occur in ethanol, creating a split fiber containing highly separated graphitic fibrils, which require no subsequent mechanical shearing treatment.

More specifically, a carbon or graphite fiber can be intercalated with alkali (Li, Na, K, Rb, Cs), alkaline earth (Ca, Ba, Sr), or lanthanide metals (Eu, Yb, Sm, Tm) by five different methods: (1) The larger alkali metals (K, Rb, Cs) intercalate the fiber readily by heating at 200° C. Lithium can be intercalated into a carbon fiber, but only at higher temperatures and/or pressures. Sodium intercalation is difficult, but can be accomplished using high reaction temperatures (500-600° C.) for one week. Intercalation using the alkaline earth (Ca, Ba, Sr) or lanthanide metals (Eu, Yb, Sm, Tm) also requires high temperatures and longer reaction times (similar to lithium intercalation); (2) The carbon or graphite fiber can be intercalated electrochemically using a non-aqueous solvent; (3) An alkali plus naphthalene or benzophenone can be used with a suitable non-aqueous solvent (usually an ether such as tetrahydrofuran); (4) Any of the above mentioned metals (except Li and Na) can be intercalated by dissolving in a liquid ammonia solution to create solvated electrons; and (5). Lithium can be intercalated into a carbon or graphite fiber by using n-butyl lithium in a hydrocarbon solvent (e.g., hexane).

The following examples serve to provide the best modes of practice for the present invention and should not be construed as limiting the scope of the invention:

EXAMPLE 1

Graphitic Fibrils from PAN-based Graphite Fibers

Continuous graphite fiber yarns (Magnamite from Hercules) were cut into segments of 5 mm long and then ball-milled for 24 hours. Approximately 20 grams of these milled fibers were immersed in a mixture of 2 L of formic acid and 0.1 L of hydrogen peroxide at 45° C. for 4 hours. Following the chemical oxidation intercalation treatment, the resulting intercalated fibers were washed with water and dried. The resulting product is a formic acid-intercalated graphite fiber material.

Subsequently, the intercalated fiber sample was transferred to a furnace pre-set at a temperature of 600° C. for 30 seconds. The intercalated graphite fiber was found to undergo rapid splitting into graphitic fibrils. Further separation of graphitic fibrils from split fibers was achieved using a Cowles shearing device. The fibril diameters were found to be in the range of 80 nm to 250 nm.

EXAMPLE 2

Graphitic Fibrils from Sulfuric/Nitric Acid-intercalated Pitch-based Carbon Fibers and Nanocomposites Containing Such Fibrils Fifty grams each of a series of carbon and graphite fibers from Amoco (P-25, P-30X, P-55S, P-75S, P-100S, and P-120S) were intercalated with a mixture of sulfuric acid, nitric acid, and potassium permanganate at a weight ratio of 4:1:0.05 (graphite-to-intercalate ratio of 1:3) for one hour. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 600° C. for 45 seconds. These samples were separately submitted to a mechanical shearing treatment in a Cowles (a rotating-blade dissolver/disperser) for 10 minutes. The resulting graphitic fibrils were examined using SEM and TEM and their length and diameter were measured. The average diameters of the resulting graphitic fibrils from P-25, P-30X, P-55S, P-75S, P-100S, and P-120S were found to be approximately 120 nm, 155 nm, 343 nm, 456 nm, and 576 nm, respectively.

Graphitic fibrils from P-25, P-55S, and P-100S were separately mixed with an epoxy resin to obtain nanocomposite samples of various fibril weight fractions. For comparison purposes, multi-walled carbon nanotubes (MW-CNTs from Cheap Tubes, LLC) and vapor-grown carbon nano-fibers (VG-CNFs from Pyrograf) were also mixed with the same epoxy resin under comparable processing conditions to form composite samples. The flexural properties (flexural strength and flexural modulus) and thermal conductivity values of the nanocomposite samples were measured and plotted as a function of the fibril volume fraction.

Figure 4A:
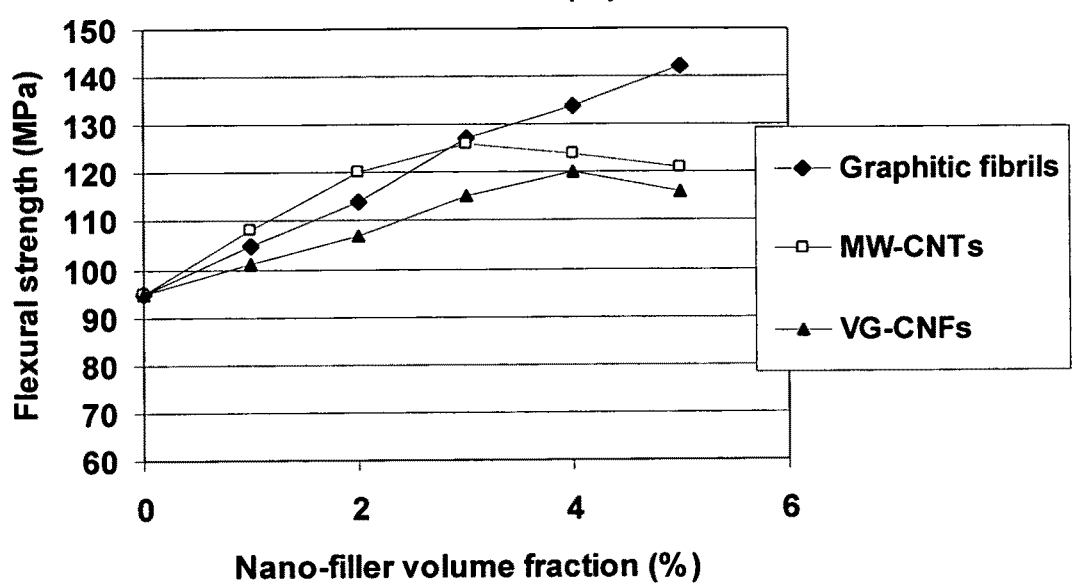

FIG. 4(a) demonstrates that the flexural strength of MW-CNT/epoxy composites is slightly higher than that of our graphitic fibril/epoxy composite at an equal nano-filler volume fraction when the volume fractions are relatively low (<3%). However, the strength of CNT composites drops significantly beyond 3% by volume of CNTs, likely due to the difficulty in disentangling CNTs and dispersing CNTs in a resin. This was not the case for our graphitic fibril composites. The ease of dispersing and processing is one of the surprising and highly desirable features of the presently invented graphitic fibrils. Also surprisingly, the strength of graphitic fibril composites is consistently higher than that of VG-CNF composites. This is likely due to the better dispersion of graphitic fibrils in epoxy resin, stronger interfacial bond between graphitic fibrils and epoxy resin (since there is no inert thermal carbon overcoat on our graphitic fibrils and graphene edges are directly accessible by the resin), and the higher strength of the graphitic fibrils (since all the graphene planes are well-aligned parallel to the fibril axis).

Figure 4B:
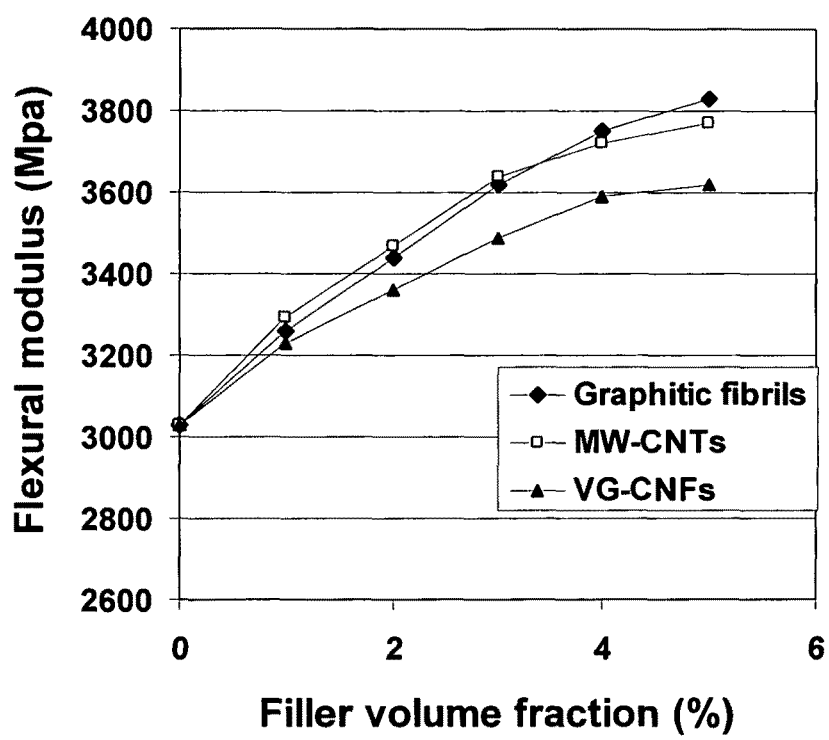

Possibly for these same reasons, the flexural modulus of graphitic fibril-epoxy composites is consistently higher than that of VG-CNF composites, as shown in FIG. 4(b). The flexural modulus of the graphitic fibril composite is comparable to that of the CNT composite.

Even more surprisingly, as shown in FIG. 5, the thermal conductivity of graphitic fibril composites is significantly higher than that of corresponding VG-CNF composites by a big margin. This could be due to the intrinsically higher thermal conductivity of graphitic fibrils and better dispersion of graphitic fibrils in a resin as compared with VG-CNFs, which tend to form an agglomerate called a "bird's nest."

Although a resin is herein used as an example, the matrix material for making a nanocomposite is not limited to a polymer (thermoplastic, thermoset, rubber, etc). The matrix can be a glass, ceramic, carbon, metal, or other organic material, provided the matrix material can be mixed with graphitic fibrils via melt mixing, solution mixing, vapor infiltration, solid state sintering, etc. The weight fraction of graphitic fibrils in such a nanocomposite can be between 0.01% and 90%. The high fibril weight percentage nanocomposite may be produced by forming graphitic fibers into a porous paper or web form, followed by impregnating a resin into the pores or simply immersing the paper or web in a resin solution. The resin content can be controlled to be even lower than 10% by weight.

The production processes for carbon fiber reinforced carbon matrix, metal matrix, glass matrix, and ceramic matrix composite materials are well-known in the art. The presently invented graphitic fibrils are similar in processing characteristics than short or chopped carbon/graphite fibers. Hence, the processing methods of graphitic fibril composites are expected to be similar to those for short fiber composites.

As one example, graphitic fibrils can be dispersed in a petroleum or coal tar pitch, or a high carbon yield resin (such as phenolic resin, PAN, and polyfufuryl alcohol) to form a composite component. This component can then be subjected to carbonization treatment (600-2,500° C.) to convert the resin into a carbon matrix to make a graphitic fibril-carbon matrix composite (C/C composite). A C/C composite is a particularly useful friction product (friction component in an automobile transmission or clutch system) or aircraft brake material. The C/C composite may be further heat-treated at a temperature higher than 2,500 C to graphitize the carbon matrix to make a graphitic fibril/graphite composite material (Gr/Gr composite). Such a Gr/Gr composite is of particular utility value in ultra-high temperature applications, e.g., as a rocket motor casing, rocket nose cone, refractory lining, and steel-making furnace electrode material. Due to the high radiation cross-section, these high strength Gr/Gr composites can be used for radiation-shielding applications against high-energy beams, such as neutron and Gamma radiation.

EXAMPLE 3

Graphitic Fibrils from Electrochemical Intercalation and Splitting of Carbon Fibers In a typical experiment, one gram of P-25 fibers, ground to approximately 220 µm in length, was used as the anode material and 1 L of nitric acid was used as the electrolyte and intercalate source in an electrochemical intercalation system. The anode supporting element is a platinum plate and the cathode is a graphite plate of approximately 4 cm in diameter and 0.2 cm in thickness. The separator, a glass fiber fabric, was used to separate the cathode plate from the graphite/carbon fibers and to compress the fibers down against the anode supporting element to ensure that the graphite/carbon fiber segments are in electrical contact with the anode supporting element to serve as the anode. The electrodes, electrolyte, and separator are contained in a Buchner-type funnel to form an electrochemical cell. The anode supporting element, the cathode, and the separator are porous to permit intercalate (electrolyte) to saturate the fibers and to pass through the cell from top to bottom.

The fiber segments were subjected to an electrolytic oxidation treatment at a current of 0.5 amps (current density of about 0.04 amps/cm$^2$) and at a cell voltage of about 4-6 volts for 30 minutes. These values may be varied with changes in cell configuration and makeup. Following electrolytic treatment, the resulting intercalated fiber was washed with water and dried.

Subsequently, approximately ⅔ of the intercalated fiber sample was transferred to a furnace pre-set at a temperature of 600° C. for 30 seconds. The intercalated fiber was found to induce rapid splitting. An ultrasonicator (operated with a power of 80 W) was used to separate the fibrils. The diameters of individual fibrils were found to range from 130 to 350 nm based on SEM observations.

The suspension of graphitic fibrils dispersed in water, after ultrasonication-assisted dispersion, was sprayed (printed) onto a paper substrate to form a line of approximately 3 mm wide and 15 µm thick. Similarly, MW-CNTs and VG-CNFs were also formed into traces of conductive fillers. The electrical conductivity of these conductive filler lines or traces (no binder) was measured using a four-point probe method. The data is summarized in FIG. 6, which indicates that graphitic fibrils and CNTs have comparable electrical conductivity, which is significantly higher than that of VG-CNFs.

EXAMPLE 4

Supercritical $CO_2$ Fluid Intercalation and Splitting of Graphite Fibers

One gram of PAN-based graphite fibers (Magnamite from Hercules) was placed in a tube furnace at a temperature of 800° C. in a nitrogen atmosphere for 3 hours to remove the surface finish of graphite fibers.

The treated graphite fiber sample was placed in a 100 milliliter high-pressure, single-compartment vessel with a heating provision. The vessel was capable of being isolated from the atmosphere by security clamps and ring. The vessel was in fluid communication with the high-pressure carbon dioxide by way of piping means and limited by valves. A heating jacket was disposed about the vessel to achieve and maintain the critical temperature of carbon dioxide.

When the vessel was isolated, the pressurized carbon dioxide was introduced therein and maintained at about 1,100 psig (pressure of 76 bars). Then, the vessel was heated to about 70° C. at which the supercritical conditions of carbon dioxide were achieved and maintained for about 30 minutes to effect intercalation. Then, the vessel was immediately depressurized at a rate of about 3 milliliters per second, thus catastrophically lowering the pressure within the vessel. This was accomplished by opening a connected blow-off valve of the vessel. As a result, a split graphite fiber was formed. After a mechanical shearing treatment in a laboratory-scale Cowles rotating blade device for 15 minutes, the resulting graphitic fibrils exhibit a diameter ranging from 65 nm to 156 nm.

COMPARATIVE EXAMPLE 5

Un-separated, Split Carbon Fibers and Composites

Additional amounts of thermally split graphite fibers (P-25) were prepared according to the procedure described in Example 2 above, but the split fibers did not go through a mechanical shearing step to isolate the graphitic fibrils. These split graphite fibers composed of un-separated (still interconnected) fibrils are fundamentally different materials from the isolated graphitic fibrils of the present invention.

The split or conventionally exfoliated carbon or graphite fibers (without a mechanical shearing treatment) are relatively soft, of lower strength, and lower density (approximately 1.4-2.0 $g/cm^3$), and they are essentially a loosely connected web structure (FIG. 7a). In contrast, the isolated fibrils (e.g., FIG. 7b) are of exceptionally high strength and high stiffness, and have higher physical density (approximately 2.25 $g/cm^3$).

Analogously, the exfoliated graphite (or graphite worms obtained by intercalating natural graphite to obtain a graphite intercalation compound and then exfoliating the resulting graphite intercalation compound) is soft, fluffy, of extremely low strength, highly porous, and composed of graphite flakes or graphene planes spaced apart by pores (a graphite worm is shown in FIG. 7c). In contrast, after mechanical shearing, one obtains nano graphene platelets, which were recently found to exhibit the highest intrinsic strength and highest thermal conductivity of all materials known to scientists. Nano graphene is now commonly regarded as the most promising nano material in the scientific community. These observations further assert the significance of the final mechanical shearing step in isolating/separating the graphitic fibrils (e.g. FIG. 7d).

We proceeded to mix the split but un-separated graphite fibers in the same epoxy resin as used in Example 2 to produce "split graphite fiber-reinforced composites" or "exfoliated graphite fiber-reinforced composites," as opposed to the presently invented graphitic fibril-reinforced composites. A comparison of the flexural modulus and strength of these two classes of composite materials is given in FIGS. 8a and 8b. These data have clearly demonstrated that the graphitic fibrils of the present invention are dramatically more effective in reinforcing a resin matrix as compared with split or exfoliated graphite fibers (without a mechanical shearing step). These highly surprising results could not have been anticipated and, actually, have not been anticipated by any prior art workers. It is fair to say that, after diligent research and development work, we have discovered a totally new class of high-performance materials that have tremendous utility value. This new class of materials has never been taught in the prior art and has not been an obvious extension of any prior art work.

COMPARATIVE EXAMPLE 6

Prior Art Poly(Methyl Methacrylate) Composites Containing Un-Separated, Exfoliated Carbon Fibers [M. Toyoda, et al, "Study of Novel Carbon Fiber Composite Used Exfoliated Carbon Fibers," Materials Science and Engineering, B 161 (2009) 202-204]

M. Toyoda et al prepared poly(methyl methacrylate) (PMMA) composites containing exfoliated, but un-separated carbon fibers. We followed essentially identical procedures to prepare the exfoliated carbon fibers, but proceeded further to isolate the constituent graphitic fibrils from the exfoliated carbon fibers. We then prepared the composite materials according to the procedure of M. Toyoda, et al. and conducted three-point bending tests on these composite samples. Our data and the data reported by Toyoda et al were plotted together in FIG. 9.

Figure 9A:
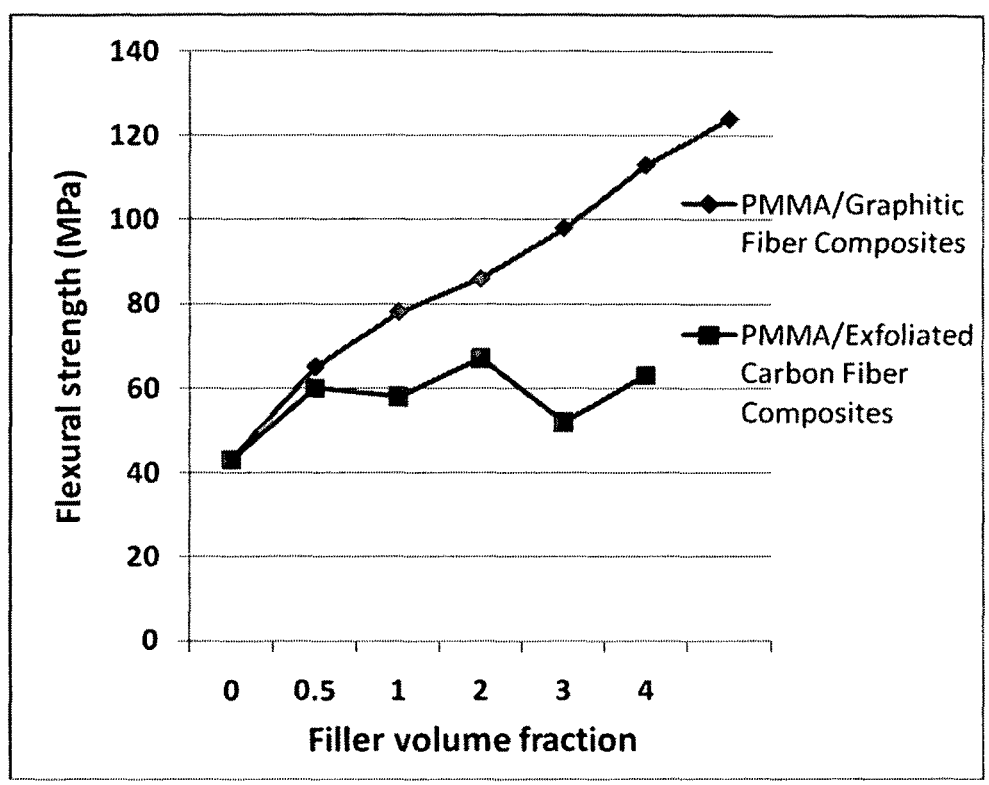
Figure 9B:
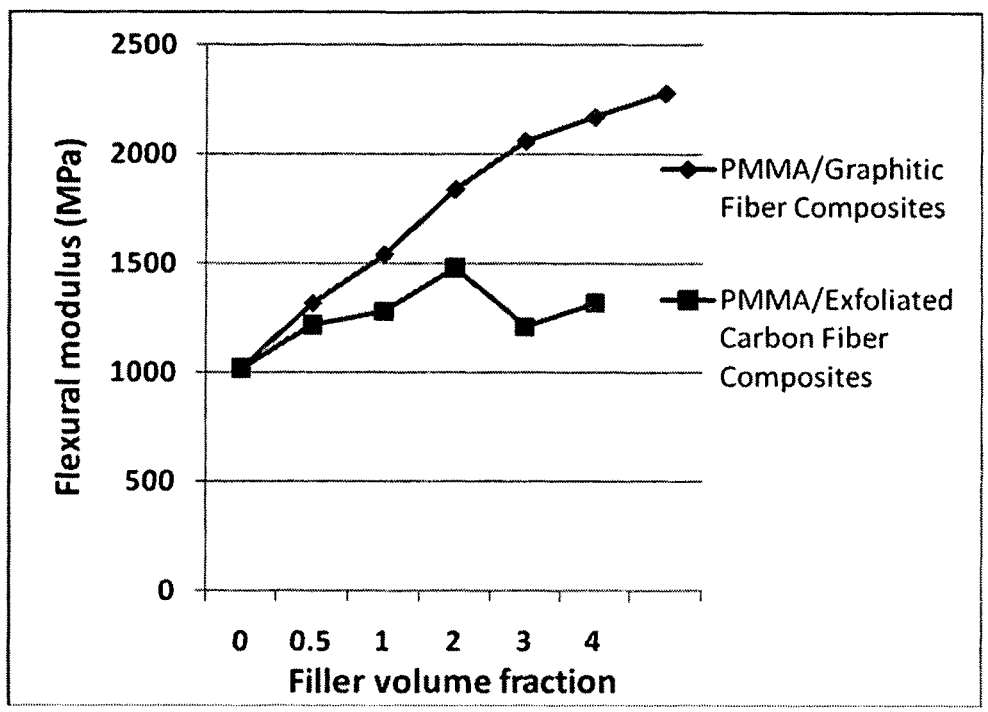

FIG. 9(a) and FIG. 9(b) show the flexural strength and flexural modulus, respectively, of both the prior art PMMA composite materials containing exfoliated fibers (composed of interconnected fibrils; no fibril separation/isolation treatment) and the PMMA composites containing isolated graphitic fibrils of the present invention. These data further demonstrate that the presently invented submicron graphitic fibrils are far superior to the prior art exfoliated carbon fibers in terms of the reinforcing efficiency in a composite material. Both the flexural strength and modulus of the PMMA composites featuring the presently invented graphitic fibrils are significantly higher than those of the prior art composites. These observations again further assert the notion that our submicron graphitic fibrils are fundamentally different and patently distinct from the conventionally exfoliated carbon or graphite fibers without a mechanical shearing for fibril isolation. This observation has been most surprising and could not have been anticipated by a person of ordinary skills based on any prior art work or a combination of prior art teachings.

The presently invented graphitic fibrils have the following desirable features and advantages when compared with carbon nanotubes (CNTs) and conventional carbon nanofibers:
  (1) The presently invented graphitic fibrils can be readily mass-produced at low costs. Millions of kilograms of carbon or graphite fibers are produced annually at a much lower prices (e.g., $20-30/Kg) than CNTs (e.g., currently >$150/Kg, up to several thousands of US dollars per kilogram for high-purity products) and CNFs (>$200/Kg). The process involves a simple intercalation procedure, which requires a much shorter intercalation time as compared with intercalation of graphite particles since penetration of chemical into inter-graphene spaces is not required. Intercalation of graphite is commonly practiced to produce graphite worms and flexible graphite sheets. This process is relatively low-cost, adding less than $2-3 per kilogram for processing costs. Since our process requires penetration of an intercalating agent into inter-crystallite or imperfection regions of a carbon or graphite fiber (not necessarily the inter-graphene spaces), more environmentally benign intercalating agents can be used; e.g., formic acid or citric acid as opposed to sulfuric and nitric acids.

(2) The submicron graphitic fibrils have a well-controlled, consistent, and stable structure to ensure consistent properties and performance. The structure is already highly graphitized, requiring no further graphitization treatment. The graphitic structure remains stable in a non-oxidizing environment up to 3,000° C.

(3) The presently invented graphitic fibrils are pure and catalyst-free.

(4) Graphitic fibrils exhibit much more surface areas for chemical functionalization or interactions with a chemical species or a matrix material. This is a critically important feature since the ability for a nano-filler surface to be easily modified chemically or physically in a controlled manner is essential to the success of many engineering applications. For instance, the large graphene edge surface area makes this graphitic fibrils readily functionalized by functional groups (e.g., amine) that are chemically compatible or reactive with a resin (e.g. epoxy) for composite material applications.

(5) The graphitic fibrils exhibit higher strength, modulus, thermal conductivity, and electrical conductivity as compared with conventional CNFs. These properties of graphitic fibrils are comparable to those of CNTs.

The applicants have observed that the presently invented graphitic fibrils, when incorporated in the following products, impart highly desirable properties to these products, including: (a) paper, thin-film, mat, and web products (e.g., as a membrane or filter material); (b) rubber or tire products (to stiffen selected portions of a tire and to aid in heat dissipation); (c) energy conversion or storage devices, such as fuel cells, lithium-ion batteries, and supercapacitors; (d) adhesives, inks, coatings, paints, lubricants, and grease products (as a conductive additive and/or friction- or wear-reducing agent); (e) heavy metal ion scavenger; (f) absorbent; (g) sensors; (h) friction and brake components; (i) radiation shield; and (j) nanocomposite materials.

Hence, other embodiments of the present invention include:

(a) A paper, thin-film, mat, web, membrane, or filter product containing the presently invented graphitic fibril: The paper, mat, or web containing graphitic fibrils is a good substrate material to support electro-active materials, such as Si, in a lithium-ion battery. They provide a protective layer on the composite aircraft skin for lightning strike protection since graphitic fibrils are highly conductive. These products are also good filter or membrane materials due to the strength and rigidity of graphitic fibrils and their ability to kill biological agents when these fibrils are activated;

(b) A rubber or tire product containing the graphitic fibril: A tire product makes use of the high elastic modulus to stiffen selected portions of a tire and the high thermal conductivity to aid in the heat dissipation; the driving-induced heat would otherwise significantly increase the tire wear rate. Graphitic fibrils significantly increase the strength and conductivity of a rubber;

(c) A fuel cell bipolar plate (graphitic fibrils serving as a conductive additive in a resin), gas diffuser plate (conductive mat of graphitic fibrils), or electrode containing the graphitic fibril (fibrils serving as an electrocatalyst-supporting substrate);

(d) An electrochemical device: For instance, graphitic fibrils are used as an electrode active material, a conductive additive, or a current collector ingredient in a supercapacitor, lithium ion battery, lithium metal battery, and/or lithium-air battery).

(e) An adhesive, ink, coating, paint, lubricant, or grease product containing the graphitic fibril: These products make use of the electrical conductivity, thermal conductivity, graphitic plane-sliding characteristic, friction-controlling, and wear-reducing capabilities of graphitic fibrils;

(f) A heavy metal ion scavenger or absorbent containing the graphitic fibril: These applications make use of the easily attached functional groups to capture heavy metal ions, bacteria, oil in a stream;

(g) A sensor device containing the graphitic fibril as a sensing element: The conductivity, capacitance, and other electro-chemical characteristics of fibrils are highly sensitive and selective to the presence of analytes, contaminants, or other chemical and biological agents;

(h) A friction component or brake component containing the graphitic fibril: The graphitic fibrils are excellent ingredient in a friction plate commonly used in an automobile clutch or transmission system. Graphitic fibrils incorporated in a carbon matrix provide a good carbon-carbon composite that exhibits outstanding braking performance in an aircraft brake environment;

(i) A radiation-shield component containing the graphitic fibril: Graphite is an excellent high-energy radiation resistant material. By combining graphitic fibrils with a graphitized carbon matrix, we obtain a graphite/graphite (Gr/Gr) composite that is of high strength and high radiation resistance.

The invention claimed is:

1. A submicron-scaled graphitic fibril having a thickness in the range from 100 nm to 1 μm and a length greater than 5 μm, wherein throughout the fibril, said fibril is free of continuous thermal carbon overcoat, free of continuous hollow core, and free of catalyst, and wherein said fibril comprises at least 95% by weight carbon atoms arranged in a hexagon or graphene structure that form a graphite single crystal, and said fibril is obtained by splitting a micron-diameter carbon fiber or graphite fiber.

2. The graphitic fibril of claim 1 wherein said diameter or thickness is in the range from 500 run to 1 μm.

3. The graphitic fibril of claim 1 wherein said diameter or thickness is between 100 and 500 μm.

4. The graphitic fibril of claim 1 wherein said fibril has a length greater than 10 μm.

5. The graphitic fibril of claim 1 wherein said fibril is obtained by thermo-chemically splitting a carbon or graphite fiber into an aggregate of multiple interconnected or partially bonded fibrils and separating said graphitic fibril from said aggregate.

6. The graphitic fibril of claim 1 wherein said fibril comprises at least 98% by weight carbon atoms arranged in a hexagon or graphene structure.

7. The graphitic fibril of claim 1 wherein said fibril has an elongate axis and comprises a graphite single crystal having multiple layers of graphene plane parallel to the fibril elongate axis.

8. The graphitic fibril of claim 1 wherein said fibril comprises at least 300 layers of graphene plane.

9. The graphitic fibril of claim 1 which is prepared from a micron-diameter carbon fiber or graphite fiber having a diameter greater than or equal to 6 μm.

10. The submicron graphitic fibril of claim 1 which is prepared by using a method comprising (a) intercalating a carbon fiber or graphite fiber with an intercalating agent to form an intercalated fiber; (b) thermally and/or chemically splitting or exfoliating said intercalated fiber to obtain a split fiber; and (c) mechanically separating said graphitic fibril from said split fiber.

11. The submicron graphitic fibril of claim 1 which is prepared by using a method comprising (a) intercalating a carbon fiber or graphite fiber with a supercritical fluid to form a tentatively intercalated fiber at a first temperature and a first pressure; (b) exposing said tentatively intercalated fiber to a second temperature or a second pressure to obtain a split carbon or graphite fiber; and (c) mechanically isolating said graphitic fibril from said split fiber.

12. A nanocomposite material comprising multiple graphitic fibrils as defined in claim 1 wherein said fibrils are dispersed in a matrix material and wherein said graphitic fibrils have a weight fraction between 0.1% and 90% of the nanocomposite.

13. The nanocomposite of claim 12 wherein said matrix material is selected from the group consisting of a polymer, rubber, plastic, resin, glass, ceramic, carbon, metal, organic, and combinations thereof.

* * * * *